Oct. 4, 1938.  J H. HUNT ET AL  2,132,298
VEHICLE WHEEL
Original Filed June 30, 1932
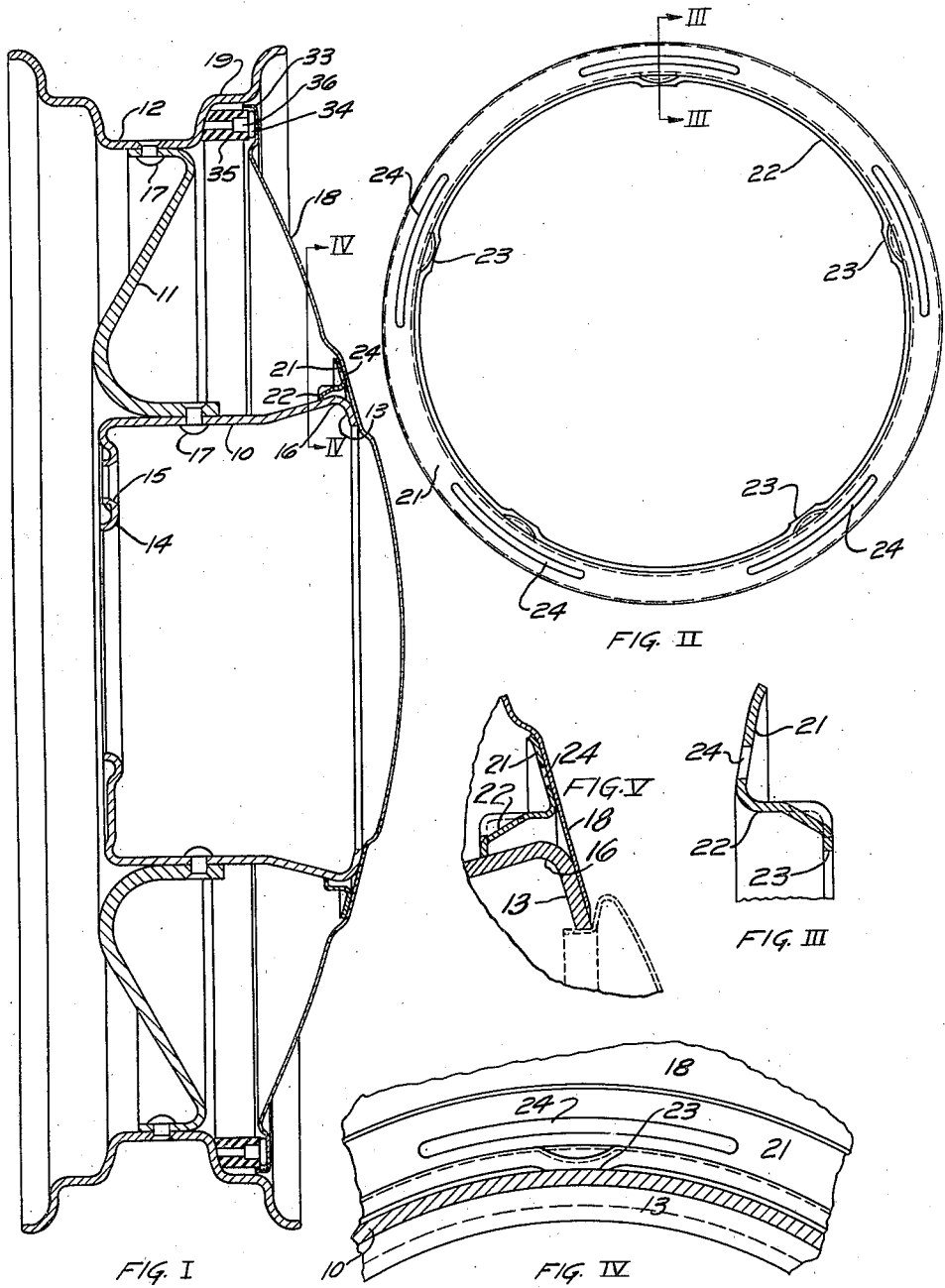
FIG. I  FIG. II  FIG. III  FIG. IV  FIG. V
INVENTOR.
J Harold Hunt
and
Harry J. Horn
BY
Carroll R. Taber
Their ATTORNEY.

Patented Oct. 4, 1938

2,132,298

UNITED STATES PATENT OFFICE 2,132,298

VEHICLE WHEEL

J Harold Hunt and Harry J. Horn, Lansing, Mich., assignors, by mesne assignments, to George Albert Lyon, Detroit, Mich.

Original application June 30, 1932, Serial No. 620,064. Divided and this application January 30, 1935, Serial No. 4,172

REISSUED

14 Claims. (Cl. 301—37)

The present invention relates to the combination with a vehicle wheel of a removable shield or cover therefor and more particularly to novel means for detachably connecting the cover to the wheel. This application is a division of our copending application Serial No. 620,064, filed June 30, 1932, which matured into Patent 1,993,061 March 5, 1935.

Shields or cover plates are used with vehicle wheels for the purpose of improving the appearance of the wheel. A light weight metal shield can be formed to provide any desired configuration within wide limits and can be finished in substantially any desired manner. The primary function of a wheel is to support the vehicle with which it is associated and it must necessarily be designed to accomplish this result. In producing wheels utility is of greater consideration than appearance. Accordingly shields are provided for vehicle wheels to supply the desired decorative effect without impairing the maximum utilitarian efficiency of the wheel.

Where decorative shields are used in combination with vehicle wheels it is desirable to make them removable whereby ready access may be had to the various parts of the wheel. Considerable difficulty has been experienced heretofore in providing suitable means for removably securing a shield to a vehicle wheel. Where some permanent securing means such as bolts or screws are used the cost of the assembly is materially increased and the facility with which the shield may be installed or removed is impaired. Difficulty is also experienced in removably securing shields to vehicle wheels in a manner whereby all objectionable rattles due to metallic contact between the wheel and shield is eliminated.

The principal object of the present invention is the provision of resilient means for removably securing a shield to a vehicle wheel whereby to facilitate the removal and installation of the shield and at the same time effect a firm engagement with the wheel when installed.

An illustrative embodiment of the invention is shown in the accompanying drawing in which:

Figure I is a cross sectional view of a vehicle wheel provided with a shield attached thereto by resilient attaching means;

Figure II is a side view in elevation of an attaching ring carried by the shield shown in Figure I;

Figure III is an enlarged sectional view taken on substantially the line III—III of Figure II;

Figure IV is an enlarged sectional view taken on substantially the line IV—IV of Figure I.

Figure V is an enlarged sectional view of a modified form of cover plate having a central opening therein and showing the relation of the shield to the hub.

The vehicle wheel shown in Figure I as an illustrative embodiment of the present invention consists of a cylindrical hub shell 10, a wheel body 11 in the form of a curved disc secured to the hub shell 10, and a conventional drop center tire carrying rim 12 secured to the outer periphery of the disc 11. It should, of course, be understood that any other form of wheel body such as wood, wire or steel spokes may be utilized in place of the disk 11 if desired. Likewise, a conventional wheel felloe may be used in place of the rim 12 without departing from the spirit or scope of the present invention.

The hub shell 10 is provided with an inturned flange 13 at the front side thereof and with an inturned flange 14 at the rear side. Suitable openings 15 are formed in the flange 14 by means of which the hub shell 10 is secured to a wheel hub. The hub shell 10 is preferably formed with an enlarged portion indicated at 16 adjacent the front edge thereof whereby a decorative shield is secured thereto as will be described presently. The wheel disc 11 is secured to the hub shell 10 and the rim 12 respectively by rivets 17.

A substantially circular shield 18 of a diameter somewhat less than that of the shoulder portion 19 of the rim 12 is positioned against the side of the wheel with its peripheral portion within the annular shoulder portion 19 of the rim 12. As shown the shield comprises a continuous circular sheet of metal which closes the opening formed at the front side of the hub shell 10 whereby the necessity for a hub cap is eliminated.

The shield 18 is removably secured to the vehicle wheel by means of a ring 21 which is preferably welded to the inner surface of the shield adjacent its central portion. A laterally extending portion 22 of the ring 21 is of substantially the same or slightly greater diameter than the enlarged portion 16 of the hub shell 10. A plurality of projections 23 are formed in the lateral portion of the ring 21 by depressing the edge thereof at intervals about the circumference. These projections decrease the effective internal diameter of the portion 22 whereby the ring may be sprung over the enlarged portion 16 of the hub shell 10 and pressed into snug engagement with the external surface of the hub shell adjacent the enlarged portion 16. An opening 24 is formed in the ring 21 immediately behind each of the projections 23 to increase the flexibility of the ring in the region of the projections in order to facilitate the installation and removal of the shield 18.

While openings 24 of the size, shape and location shown in the accompanying drawing have been found to be very effective it should be understood that the invention is not limited to the particular construction shown, but that the size, shape and location of the opening may be varied as convenience dictates. The essential requisite is that the opening 24 be located adjacent the projections 23 in order to increase the flexibility of the ring 21 in that region so that the ring may flex sufficiently to permit the projections 23 to pass over the enlarged portion 16 of the hub shell 10. Likewise the invention is not limited to the particular form of projections 23 herein shown and described. Any other suitable form of projection may be employed so long as it is suitably positioned with respect to the openings 24.

While the securing ring 21 has been shown and described in connection with a continuous shield 18 it may of course also be used with the shield which has a central opening therethrough for the reception of a removable hub cap, as illustrated in Figure V. In that form of construction the ring 21 will be spaced radially outwardly a slight distance from the edge of the shield which defines the central opening therethrough.

The periphery of the shield 18 is preferably flanged as indicated at 33 and is positioned within the shoulder portion 19 of the rim 12. Rivets 34 are welded to the inner suface of the periphery of the shield 18 at spaced intervals. Non-metallic caps 35 such as rubber, for example, provided with central openings therethrough are extended over the ends 36 of the rivets 34. The caps 35 are preferably cylindrical in shape and of considerably greater length than the rivets 36 whereby to prevent the periphery of the disc from contacting the rim 12 direct. In this manner a resilient non-metallic contact is provided between the periphery of the shield 18 and the rim 12 whereby all objectionable noises and rattles are eliminated. The size of caps 35 and the manner in which they are secured to the shield may, of course, be varied to any desired extent as long as they prevent the shield from contacting the rim.

It will be perceived from the illustration in Figure I that the outer periphery of the wheel disk or shield 18 terminates adjacent the wheel rim 12 and is adapted to be guided into position by the shoulder or flange portion 19 of the rim. This feature is advantageous in that upon an axial movement of the shield or plate relative to the wheel, the wheel flange 19 is enabled to assist in the alignment of the shield with the wheel preparatory to the snapping of the shield into retained engagement with the hub or nave of the wheel. As a result thereof, the wheel shield or disk is not only initially aligned with the wheel in proper covering position over the outer side of the wheel, but in attaching the disk, the snap on operation is greatly facilitated since the spring retaining means or elements 23 are initially centered with respect to the wheel hub 10 and in a position to be snapped home in cooperation therewith. Furthermore, by reason of the termination of the outer periphery of the disk adjacent the wheel rim and inwardly of the outermost periphery of the wheel rim, a pry-off tool could be inserted with facility between the edge of the shield or disk and the wheel rim flange 19 for the purpose of prying the disk free of its engagement with the central wheel part or hub. Also by reason of the flexibility and resiliency of the elements 23 certain of these elements will be initially deflected by the pry-off action and are aided in the ejection of the disk from the wheel after a predetermined prying movement. Then too, since the spring elements are located centrally of the disc, it follows that upon a pry-off force being applied to one side of the disk, the opposite side thereof will pivot about a fulcrum point on the rim at said opposite side to enable disengagement of all of the spring elements 23 with a single pry-off movement. It will also be noted that the central annular ring 21 includes a flange connected with the disk at the point of the application of the spring pressure, hence, this flange 21 is adapted to bear the stress of the spring means 23 as the disk is snapped into place on the wheel. That is to say, this ring, which is on the inside of the outer periphery of the disk and projects inwardly adjacent the hub part, is adapted to bear the brunt of the tensional forces set up in the deflection of the spring elements as the disk is pressed axially into retained engagement with the central part of the wheel. Also by reason of the fact that the central part of the shield or disk is held under spring tension on the wheel, the rubber or cushioning elements 35 are placed under compression, as shown in Figure I. The advantage of this feature is that it minimizes rattling of the disk on the wheel since the disk has a cushioned seat at its outermost periphery.

We claim:

1. The combination with a wheel and a cover therefor of means for attaching the cover to the wheel comprising an annulus of substantially L-shape in cross section, one leg of the annulus being provided with a plurality of projections adapted to engage a cylindrical portion of the wheel, the other leg being connected to the cover and provided with openings adjacent said projections.

2. As an article of manufacture, an automobile wheel ornamental plate structure for covering the space between the rim and hub of the wheel, including a circular plate having a laterally extending portion for cooperation with a wheel rim surface at the outer periphery of the plate and formed to extend over the center of the wheel, said plate having an inner portion formed for yieldable cooperation with the hub of the wheel, said inner portion of the plate having spaced teeth for yieldably embracing the wheel hub.

3. In combination, a wheel including a flanged tire rim part and a central wheel hub part, and an ornamental circular disc extending inwardly from the rim part toward the hub part and over the center of the wheel, said disc having a slidable yielding contact with the hub part to allow its outer portion to yieldably bottom or rest against said flanged rim.

4. In combination with a wheel including rim and hub parts, a circular plate of relatively thin metallic sheet material extending between said wheel parts and over the center of the wheel and formed to be snapped into engagement with said parts, and concealed resilient means for yieldably retaining it in engagement with said wheel parts.

5. In a wheel construction, a wheel including hub and rim parts and a snap on wheel disk for disposition over an outer side of the wheel, said disk having an annular strengthening ring adjacent the hub part and there being disk retaining spring means between said ring and hub part, said ring including a flange connected to an intermediate portion of the disk and adapted to bear the stress of the spring means as the disk is snapped in place on the wheel.

6. In combination, a wheel having rim and hub portions, an ornamental disk radially inward of the outer periphery of the rim and extending over the outer face of the wheel including its hub portion, and cooperating disk retaining parts on said disk and wheel formed to enable said disk to be snapped into retained engagement with said wheel, said disk extending across the center and outer face of the wheel to conceal said retaining parts and being readily disengageable by the prying of said disk off of said wheel.

7. In combination, a wheel, an ornamental disk formed to extend over substantially the entire outer face of the wheel to conceal the same, and cooperating parts on the wheel and disk including resilient means formed to enable said disk to be snapped into a retained position on the wheel, said disk having an outer portion adapted to make guiding contact with the wheel upon axial movement of the disk relative to the wheel to assist in the alignment of the cooperating disk retaining parts.

8. In a wheel construction, a vehicle wheel including a rim and a central flanged portion and an ornamental member for disposition over substantially the entire outer side of the wheel and means for attaching said member to the wheel consisting solely of spring retaining means including a plurality of laterally projecting free resilient projections, said means including two portions disposed at an angle to each other, one of the portions being attached in place by fastening means at a point remote from the junction of said portions, the other portion comprising one of said free projections.

9. In a wheel construction, a vehicle wheel including a rim and a body part and an ornamental disc part for disposition over substantially the entire outer side of the wheel, spring retaining means including a plurality of spaced laterally projecting resilient projections attached by fastening means to one of said parts and each having a free end for engagement with a flange on the other part, said retaining means comprising two portions disposed at an angle to each other, one of said portions being fastened to the part carrying said means at a point remote from the junction of said portions.

10. In a wheel construction, a vehicle wheel including a multi-flanged rim and a body part, an ornamental disk part for overlying an outer side of said wheel and substantially covering the same, spaced retaining spring elements attached by fastening means to one of said parts for engagement with a shoulder on the other part, said disk part terminating outwardly between spaced flanges of said rim to permit the insertion of a prying tool behind an edge of the disk part and the fulcruming of the tool on a rim flange to force the disk part off the wheel, certain of said spring elements being deflected by the prying action and aiding in ejecting the disk part from the wheel after a predetermined prying movement.

11. The combination with an automobile wheel including a tire rim and a central hub part, of an ornamental disk of thin metallic sheet material for disposition over an outer side of the wheel and having compressible means at its outer peripheral portion for cooperation with said rim and having disk-retaining means formed to be manually moved into disk retaining engagement with said hub part, said retaining means being arranged so that the act of moving same into position retains the disk on the wheel and compresses said compressible means into tight engagement with said rim, said disk being adapted to be readily manually moved on or off said wheel from the outer side of the wheel while the wheel is on a vehicle, said disk extending clear across the wheel hub so as to conceal the outer side of the wheel inside of said rim.

12. The combination with an automobile wheel including a tire rim and a central hub part, of an ornamental disk of thin metallic sheet material for disposition over substantially the entire outer side of the wheel and having resilient means at its outer peripheral portion for co-operation with said rim and having disk-retaining means formed to be snapped into disk-retaining engagement with said hub part, said retaining means being arranged so that the act of snapping same into position retains the disk on the wheel and places said resilient means under tension.

13. In combination with a wheel including rim and hub parts, a circular plate of relatively thin metallic sheet material extending between said wheel parts and over the center of the wheel and formed to be snapped into engagement with said parts, and concealed resilient means for yieldably retaining it in engagement with said wheel parts, one of said parts including an inclined shoulder and the other including a resilient edge adapted to be cammed over and down the surface of said inclined shoulder.

14. In combination, a wheel having rim and hub portions, an ornamental disk radially inward of the outer periphery of the rim and extending over the outer face of the wheel including its hub portion, and cooperating disk retaining parts on said disk and wheel formed to enable said disk to be snapped into retained engagement with said wheel, said disk extending across the center and outer face of the wheel to conceal said retaining parts and being readily disengageable by the prying of said disk off of said wheel, said cooperating disk retaining parts including a humped part and an edge adapted to be pressed over said humped part and downwardly behind the same.

J HAROLD HUNT.
HARRY J. HORN.